(12) United States Patent
Spies et al.

(10) Patent No.: US 12,043,767 B2
(45) Date of Patent: Jul. 23, 2024

(54) USE OF THERMALLY STABLE TERPENE-PHENOL RESINS

(71) Applicant: TESA SE, Norderstedt (DE)

(72) Inventors: Manfred Spies, Bad Bramstedt (DE); Yuan Li, Hamburg (DE)

(73) Assignee: TESA SE, Norderstedt (DE)

( * ) Notice: Subject to any disclaimer, the term of this patent is extended or adjusted under 35 U.S.C. 154(b) by 558 days.

(21) Appl. No.: 17/421,848

(22) PCT Filed: Jan. 6, 2020

(86) PCT No.: PCT/EP2020/050115
§ 371 (c)(1),
(2) Date: Jul. 9, 2021

(87) PCT Pub. No.: WO2020/144126
PCT Pub. Date: Jul. 16, 2020

(65) Prior Publication Data
US 2022/0098450 A1    Mar. 31, 2022

(30) Foreign Application Priority Data

Jan. 10, 2019 (DE) .................... 10 2019 200 211.0

(51) Int. Cl.
*C09J 133/08* (2006.01)
*C09J 7/38* (2018.01)

(52) U.S. Cl.
CPC ............. *C09J 133/08* (2013.01); *C09J 7/385* (2018.01)

(58) Field of Classification Search
None
See application file for complete search history.

(56) References Cited

U.S. PATENT DOCUMENTS

| | | |
|---|---|---|
| 5,457,175 A | 10/1995 | Scharrer et al. |
| 8,802,777 B2 | 8/2014 | Zoellner et al. |
| 2003/0212202 A1* | 11/2003 | Haner .................... C09J 193/04 525/54.44 |
| 2006/0235134 A1* | 10/2006 | Bach ....................... C09J 123/10 524/487 |
| 2010/0104864 A1 | 4/2010 | Zoellner et al. |
| 2012/0308814 A1* | 12/2012 | Spies ..................... C09J 133/02 428/354 |
| 2014/0378019 A1 | 12/2014 | Auktun et al. |

FOREIGN PATENT DOCUMENTS

| | | |
|---|---|---|
| DE | 10 2013 212 345 A1 | 12/2014 |
| EP | 1 978 069 A1 | 10/2008 |
| GB | 1 482 887 A | 8/1997 |

OTHER PUBLICATIONS

Translation of DE 10 215 212345 (no date).*
Satas, Donatas, "Handbook of Pressure Sensitive Adhesive Technology", Third Edition, 1999, pp. 36-61.
Fox, T.G. Bull Am. Phys. Soc. 1, 1956, 123.

* cited by examiner

*Primary Examiner* — Marc S Zimmer
(74) *Attorney, Agent, or Firm* — Norris McLaughlin, P.A.

(57) ABSTRACT

If at least one terpene-phenol resin is used as tackifying resin for pressure-sensitive adhesives based on polar framework polymers, wherein the at least one terpene-phenol resin in gel permeation chromatography analysis shows a multi-modal molar mass distribution wherein the low molecular weight peak has its maximum within a range above 260 g/mol, it is possible, even at elevated temperatures, to achieve elevated storage stability of the terpene-phenol resins, apparent from a distinct reduction in increases in softening points over time.

7 Claims, 3 Drawing Sheets

USE OF THERMALLY STABLE TERPENE-PHENOL RESINS

This application is a 371 of PCT/EP2020/050115 filed Jan. 6, 2020, which claims foreign priority benefit under 35 U.S.C. § 119 of German Patent Application No. 10 2019 200 211.0, filed Jan. 10, 2019, the disclosures of which are incorporated herein by reference.

The invention relates to the use of at least one terpene-phenolic resin as tackifier resin for pressure sensitive adhesives based on polar scaffold polymers, and to a pressure sensitive adhesive comprising at least one polar scaffold polymer and at least one terpene-phenolic resin as tackifier resin, and to a pressure sensitive adhesive tape having at least one layer of the pressure sensitive adhesive of the invention.

Terpene-phenolic resins are tackifier resins which are composed of a terpene unit, usually natural in origin, and a phenol unit, usually petrolic in origin.

The relative ease of industrial availability typically makes α-pinene, β-pinene or δ3-carene nowadays used as the terpene unit. These pinenes are reacted alone or in combination with phenol or substituted phenols or mixtures thereof. The reaction process is normally one of cationic polymerization. Obtained accordingly are terpene-phenolic resins having average molar masses of about 100 to 10 000 g/mol, preferably 500 to 2000 g/mol.

α-Pinene, β-pinene and δ3-carene accumulate in the resin of different types of pine tree. The raw materials are then actually isolated via extraction methods. In addition to this, α-pinene, β-pinene and δ3-carene are also produced during papermaking (in the kraft pulping process). Through further reaction steps, including fractional distillations, the terpenes are then accessible in high purity.

The phenol unit used is normally a pure unsubstituted phenol of petrochemical origin.

The terpene-phenolic resins thus produced, which owing to the phenol exhibit a high polarity and better aging behavior than, for example, hydrocarbon resins or rosin derivatives, can then be employed as tackifiers for pressure sensitive adhesives, especially those based on elastomers in the form of polar scaffold polymers such as polyacrylates, for example.

Pressure sensitive adhesives (PSAs; the terms "self-adhesive" and "pressure-sensitively adhesive" are accordingly used synonymously for the purposes of this specification) are, in particular, polymeric materials which—where appropriate through suitable additization with further components such as tackifier resins, for example—at the service temperature (at room temperature unless otherwise defined) are durably tacky and adhesive and attach to a multiplicity of surfaces on contact, more particularly attaching instantaneously. Simply at the service temperature, without activation by solvent or by heat, though typically through the influence of a greater or lesser applied pressure, more particularly a manually applied pressure, they are capable of wetting a substrate to be adhesively bonded sufficiently to allow interactions to develop between the material and the substrate that are sufficient for attachment.

A pressure sensitive adhesive is permanently adhesive at room temperature, thus having a sufficiently low viscosity and a high initial tack and consequently wetting the surface of the respective bonding base even with low pressure. The bondability of the adhesive derives from its adhesive properties, and the redetachability from its cohesive properties.

"Tackifiers" are compounds which endow an adhesive with tack and peel adhesion. "Tack" refers to the capacity of a material to attach spontaneously to a solid surface when it is brought into contact with that surface under very gentle pressure (cf. "Handbook of Pressure Sensitive Adhesive Technology", Donatas Satas, third edition, 1999, pp. 36 to 61). The tack of an adhesive or adhesive tape is dependent on numerous features, and the skilled person is aware of how to achieve a desired tack. These features are, for example, the surface roughness and surface tension of the layer of adhesive. A great influence is also possessed, of course, by the composition of the PSA. The nature of the base polymer, for example, has relevance. Factors playing a part here include the molecular weight and polarity of said polymer. Polyacrylates based on acrylic esters with defined chain lengths of the ester side groups exhibit properties, for example, of pressure sensitive adhesiveness. If the length of the ester side groups exceeds a certain extent, the pressure sensitive adhesive properties are lost owing to crystallization of the polymer. The polarity of polyacrylates can be adjusted, for example, by way of their acrylic acid fraction.

The possibility of establishing the desired profile of technical adhesive properties for pressure sensitive adhesive polyacrylates only by way of the copolymer composition, however, is limited. For this reason, polyacrylate PSAs as well must often have other substances added to them, such as plasticizers and, in particular, tackifying resins (tackifier resins). A "tackifier resin" in line with the general understanding of the skilled person is a low molecular mass, oligomeric or polymeric resin which increases the adhesion (the tack, the intrinsic stickiness) of the PSA in comparison to the otherwise identical PSA containing no tackifier resin. As the tackifier resin fraction goes up and as the plasticizer fraction goes up, there are increases in the tack and in the peel adhesion. On the basis of the outstanding properties of terpene-phenolic resins, this type of resin is used preferentially as a tackifier resin.

An overview of possible suitable tackifier resins is found in: Donatas Satas, Handbook of Pressure Sensitive Adhesive Technology, 2nd edition 1. Acrylic Adhesives by G. Auchter, O. Aydin, A. Zettl, D. Satas, pp. 444 to 514 and 2. Tackifier Resins by James A. Schlademann, pp. 609 to 631.

Polyacrylates are polar scaffold polymers. For a tackifier resin to exhibit effective tackifying in an elastomeric scaffold polymer, there are a number of criteria which must be met: first, the tackifier resin must be compatible with the scaffold polymer. Furthermore, the glass transition point of the tackifier resin ought to be significantly above the glass transition point of the elastomer. Moreover, the molar mass of the tackifier resin ought to be much lower than the molar mass of the elastomeric scaffold polymer. A further decisive criterion is that the tackifier resin displays good stability in aging.

All of the stated requirements must be met in order to allow a terpene-phenolic resin to impart the desired properties to a PSA in the form of a formulation compounded from a scaffold polymer and a tackifier resin.

The softening points of terpene-phenolic resins can be set as desired within wide limits. The applications of PSAs mean that the softening points of interest are between 60° C. and 200° C., more particularly between 95° C. and 135° C.

For the production of compounded polyacrylate/terpene-phenolic resin formulations, the stability of α-pinene based terpene-phenolic resins has been studied. In such studies it has been found that the stability of α-pinene based terpene-phenolic resins deteriorates continuously as the softening point goes down. In other words, the lower the softening point of the α-pinene based terpene-phenolic resin, the lower the aging stability. The aging of these terpene-phenolic resins is manifested in a continuous increase in the softening point over time. α-Pinene based terpene-phenolic resins with a softening point below about 110° C., in particular, prove less stable on thermal aging than terpene-phenolic resins with a higher softening point.

The object of the present invention was to provide a remedy and to make tackifier resins available that do not have this deficiency, i.e., which have good aging stability, while likewise displaying high compatibility with polyacrylates and meeting the above-described requirements of a tackifier resin in terms of compatibility with the scaffold polymer, glass transition point, and molar mass.

The present invention accordingly relates to the use of at least one terpene-phenolic resin as tackifier resin for pressure sensitive adhesives based on polar scaffold polymers, where the at least one terpene-phenolic resin under analysis by gel permeation chromatography shows a multimodal molar mass distribution, with the low molecular mass peak having its maximum in a region above 260 g/mol.

The object is further achieved by means of a pressure sensitive adhesive comprising at least one polar scaffold polymer and also at least one terpene-phenolic resin as tackifier resin, where the at least one terpene-phenolic resin under study by gel permeation chromatography shows a multimodal molar mass distribution, with the low molecular mass peak having its maximum in a region above 260 g/mol.

BRIEF DESCRIPTION OF THE DRAWINGS

The invention will now be described in greater detail with reference to the drawings, wherein.

Figure 1:
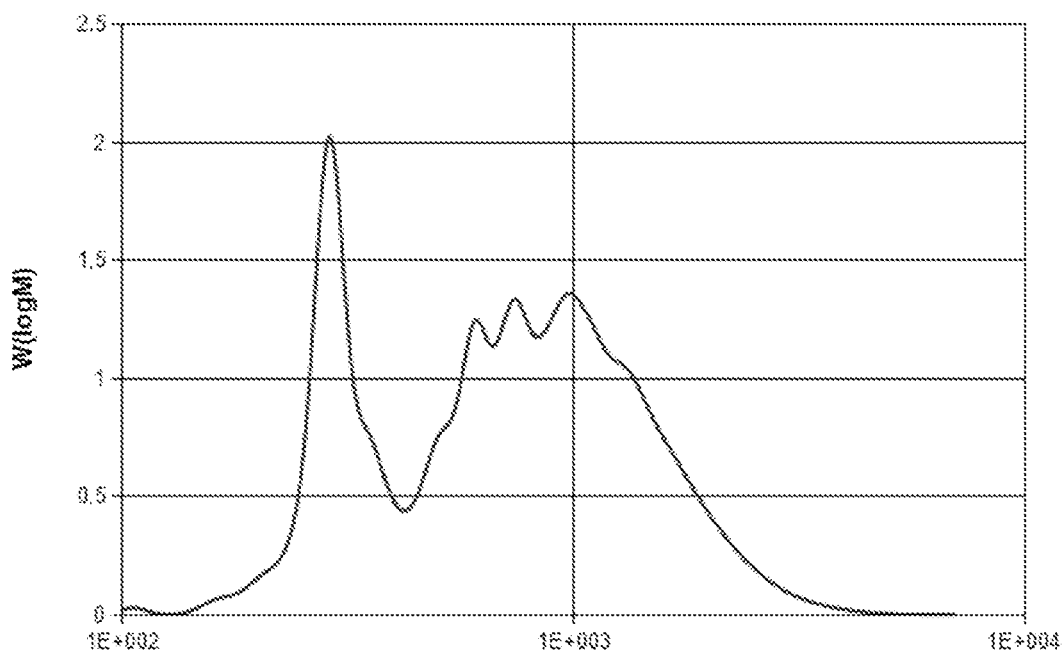
FIG. 1 is a graph depicting the associated GPC of the δ3-carene based terpene-phenol with R&B 95° C.

The study by gel permeation chromatography (GPC), meaning a gel permeation-chromatographic study, is made here under the following conditions: the eluent used is THF with 0.1 vol % of trifluoroacetic acid. The measurement takes place at 25° C. The precolumn used is PSS-SDV, 5μ, $10^3$ Å, ID 8.0 mm×50 mm. Separation takes place using the columns PSS-SDV, 5μ, $10^3$ Å and also $10^5$ Å and $10^6$ Å each with ID 8.0 mm×300 mm. The sample concentration is 4 g/l, the flow rate 1.0 ml per minute. Measurement takes place against PMMA standards. (μ=μm; 1 Å=$10^{-10}$ m).

In the study of the thermal stability of terpene-phenolic resins having at least one terpene component according to the invention it has surprisingly emerged that the softening point of the terpene-phenolic resins, even after aging, is virtually stable, and there is no increase in the softening point to the same extent as observed with terpene-phenolic resins whose terpene component comprises terpenes whose peak in the low molecular mass range lies below 260 g/mol—at 250 g/mol, for example.

Within the present invention it has surprisingly emerged that the low molecular mass fraction of terpene-phenolic resins having a peak below 260 g/mol includes constituents which are responsible for the instability of terpene-phenolic resins with low softening point that are based on such terpenes. These byproducts consist of a mixture of terpene components such as, for example, terpene dimers, terpene trimers, para-cymenes, terpene alcohols and terpene phenol components, primarily mono-terpene phenols, which may partly also be in oxidized form.

With particular advantage the at least one terpene-phenolic resin is δ3-carene based; in other words, δ3-carene is the terpene basis for the terpene-phenolic resin. The wording "basis" or "based" means in this context that predominantly δ3-carene is the terpene employed and determines the properties insofar as they are governed by the terpene.

In the study of the thermal stability of terpene-phenolic resins, it has surprisingly emerged that the softening point of such δ3-carene based terpene-phenolic resins exhibits a much smaller increase in the softening point than is observed in the case of α-pinene based terpene-phenolic resins.

The softening points of terpene-phenolic resins can be set as desired within wide limits. For pressure sensitive adhesives of the invention, particularly suitable terpene-phenolic resins are those having softening points between 60° C. and 200° C., more particularly between 95° C. and 135° C., very preferably between 95° C. and 110° C.

Conventional terpene-phenolic resins having a softening point of below about 110° C. prove to be less stable on thermal aging than terpene-phenolic resins with a higher softening point. Through the present invention it is possible to make terpene-phenolic resins having a softening point of less than 110° C.—that is, terpene-phenolic resins of low softening point—available in an aging-stable form.

In another advantageous embodiment, the terpene-phenolic resin further comprises other terpenes, particularly α-pinene. By using further terpenes as well it is possible to further modify the properties of the terpene-phenolic resin.

In one preferred embodiment the pressure sensitive adhesive comprises 20 to 60 wt % of at least one tackifier resin, based on the total weight of the pressure sensitive adhesive, preferably 30 to 50 wt % of at least one tackifier resin, based on the total weight of the pressure sensitive adhesive.

The present invention is suitable for various polar scaffold polymers. In particular it is suitable for poly(meth)acrylates.

A "poly(meth)acrylate" is a polymer whose monomer basis consists to an extent of at least 60 wt % of acrylic acid, methacrylic acid, acrylic esters and/or methacrylic esters, with acrylic esters and/or methacrylic esters being included at least proportionally, preferably to an extent of at least 50 wt %, based on the overall monomer basis of the polymer in question. More particularly a "poly(meth)acrylate" is a polymer obtainable by radical polymerization of acrylic and/or methacrylic monomers and also, where appropriate, of further, copolymerizable monomers.

In accordance with the invention the poly(meth)acrylate is or poly(meth)acrylates are present at 40 to 80 wt %, based on the total weight of the pressure sensitive adhesive. With preference the pressure sensitive adhesive of the invention comprises 50 to 70 wt %, based on the total weight of the pressure sensitive adhesive, of at least one poly(meth)acrylate.

The glass transition temperature of the poly(meth)acrylates which can be used in the invention is preferably <0° C., more preferably between −20 and −50° C.

The glass transition temperature of polymers or polymer blocks in block copolymers is determined for the purposes of this invention by means of dynamic scanning calorimetry (DSC).

The poly(meth)acrylates of the pressure sensitive adhesive of the invention are obtainable preferably by at least proportional copolymerization of functional monomers which are preferably crosslinkable with epoxide groups. More preferably these monomers have acid groups (particularly carboxylic, sulfonic or phosphonic acid groups) and/or hydroxyl groups and/or acid anhydride groups and/or epoxide groups and/or amine groups; carboxylic acid group-containing monomers are especially preferred. It is especially advantageous if the polyacrylate comprises copolymerized acrylic acid and/or methacrylic acid. All of these groups exhibit crosslinkability with epoxide groups, allowing the polyacrylate advantageously to undergo thermal crosslinking with epoxides that are introduced.

Other monomers which may be used as comonomers for the poly(meth)acrylates, besides acrylic and/or methacrylic esters having up to 30 carbons per molecule, are, for example, vinyl esters of carboxylic acids containing up to 20 carbons, vinyl aromatics having up to 20 carbons, ethylenically unsaturated nitriles, vinyl halides, vinyl ethers of alcohols containing 1 to 10 carbons, aliphatic hydrocarbons having 2 to 8 carbons and one or two double bonds, or mixtures of these monomers.

The properties of the relevant poly(meth)acrylate can be influenced in particular by varying the glass transition temperature of the polymer, through different weight fractions of the individual monomers. The one or more poly(meth)acrylates of the invention may be traced back preferably to the following monomer composition:
a) acrylic esters and/or methacrylic esters of the following formula $$CH_2=C(R^I)(COOR^{II})$$

where $R^I$ is H or $CH_3$ and $R^{II}$ is an alkyl radical having 4 to 14 carbons,
b) olefinically unsaturated monomers having functional groups of the type already defined for reactivity with epoxide groups,
c) optionally further acrylates and/or methacrylates and/or olefinically unsaturated monomers which are copolymerizable with component (a).

The fractions of the corresponding components (a), (b) and (c) are preferably selected such that the polymerization product has a glass transition temperature of <0° C., more preferably between −20 and −50° C. (DSC). It is particularly advantageous to select the monomers of the component (a) with a fraction of 45 to 99 wt %, the monomers of component (b) with a fraction of 1 to 15 wt % and the monomers of component (c) with a fraction of 0 to 40 wt % (the figures are based on the monomer mixture for the "base polymer", i.e., without additions of possible additives to the completed polymer, such as resins, etc.).

The monomers of component (a) are, in particular, plasticizing and/or apolar monomers. Preferred for use as monomers (a) are acrylic and methacrylic esters with alkyl groups consisting of 4 to 14 carbons, more preferably 4 to 9 carbons. Examples of such monomers are n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate and the branched isomers thereof, such as, for example, isobutyl acrylate, isooctyl acrylate, isooctyl methacrylate, 2-ethylhexyl acrylate or 2-ethylhexyl methacrylate.

The monomers of component (b) are, in particular, olefinically unsaturated monomers having functional groups, more particularly having functional groups which are able to enter into a reaction with epoxide groups.

Preferred for use for component (b) are monomers having functional groups selected from the group encompassing the following: hydroxyl, carboxyl, sulfonic acid or phosphonic acid groups, acid anhydrides, epoxides, amines.

Particularly preferred examples for monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinyl acetic acid, vinyl phosphonic acid, maleic anhydride, hydroxyethyl acrylate, especially 2-hydroxyethyl acrylate, hydroxypropyl acrylate, especially 3-hydroxypropyl acrylate, hydroxybutyl acrylate, especially 4-hydroxybutyl acrylate, hydroxyhexyl acrylate, especially 6-hydroxyhexyl acrylate, hydroxyethyl methacrylate, especially 2-hydroxyethyl methacrylate, hydroxypropyl methacrylate, especially 3-hydroxypropyl methacrylate, hydroxybutyl methacrylate, especially 4-hydroxybutyl methacrylate, hydroxyhexyl methacrylate, especially 6-hydroxyhexyl methacrylate, allyl alcohol, glycidyl acrylate, glycidyl methacrylate.

In principle it is possible as component (c) to use all vinylically functionalized compounds which are copolymerizable with component (a) and/or with component (b). The monomers of component (c) may serve to adjust the properties of the resultant PSA.

Illustrative monomers of component (c) are:
methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (weight average molecular weight Mw, determined by GPC, of 4000 to 13 000 g/mol), poly(methyl methacrylate)-ethyl methacrylate (Mw of 2000 to 8000 g/mol).

Monomers of component (c) may advantageously also be selected such that they contain functional groups which support subsequent radiation crosslinking (by electron beams or UV, for example). Suitable copolymerizable photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide and allyl acrylate.

The polyacrylates ("polyacrylates" is understood in the context of the invention to be synonymous with "poly(meth)acrylates") may be prepared by processes familiar to the skilled person, especially advantageously by conventional radical polymerizations or controlled radical polymerizations. The polyacrylates may be prepared by copolymerization of the monomeric components, using the customary polymerization initiators and also, if desired, chain transfer agents, with polymerization taking place at the customary temperatures in bulk, in emulsion, such as in water or liquid hydrocarbons, for example, or in solution.

The polyacrylates are prepared preferably by polymerization of the monomers in solvents, more particularly in solvents having a boiling range of 50 to 150° C., preferably of 60 to 120° C., using the customary amounts of polymerization initiators, which are in general 0.01 to 5, more particularly 0.1 to 2, wt %, based on the total weight of the monomers.

Initiators suitable in principle are all customary initiators familiar to the skilled person. Examples of radical sources are peroxides, hydroperoxides and azo compounds—for example, dibenzoyl peroxide, cumene hydroperoxide, cyclohexanone peroxide, di-t-butyl peroxide, cyclohexylsulfonyl acetyl peroxide, diisopropyl percarbonate, t-butyl peroctoate, benzpinacol. One very preferred procedure uses as its radical initiator 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Suitable solvents for preparing the poly(meth)acrylates include alcohols such as methanol, ethanol, n- and isopropanol, n- and isobutanol, preferably isopropanol and/or isobutanol, and also hydrocarbons such as toluene and, in particular, mineral spirits with a boiling range of 60 to 120° C. Additionally it is possible to use ketones such as preferably acetone, methyl ethyl ketone, methyl isobutyl ketone, and esters such as ethyl acetate, and also mixtures of solvents of the stated kind, preference being given to mixtures which comprise isopropanol, more particularly in amounts of 2 to 15 wt %, preferably 3 to 10 wt %, based on the solvent mixture employed.

The preparation (polymerization) of the polyacrylates is preferably followed by concentration, and the further processing of the polyacrylates takes place substantially without solvent. The polymer may be concentrated in the absence of crosslinker and accelerator substances. It is, however, also possible to add one of these classes of compound to the polymer ahead of the concentration, and so the concentration then takes place in the presence of said substance or substances.

The weight-average molecular weights Mw of the polyacrylates are preferably situated in a range from 20 000 to 2 000 000 g/mol, very preferably in a range from 100 000 to 1 500 000 g/mol, most preferably in a range from 150 000 to 1 000 000 g/mol. The figures for the average molecular weight Mw and the polydispersity PD in this text relate to determination by gel permeation chromatography. For that purpose it may be advantageous to carry out the polymerization in the presence of suitable polymerization chain transfer agents such as thiols, halogen compounds and/or alcohols, in order to establish the desired average molecular weight.

The polyacrylates preferably have a K value of 30 to 90, more preferably of 40 to 70, as measured in toluene (1% strength solution, 21° C.). The K value of Fikentscher is a measure of the molecular weight and the viscosity of the polymer.

Particularly suitable in accordance with the invention are polyacrylates which have a narrow molecular weight distribution (polydispersity PD<4). In spite of a relatively low molecular weight, these materials have particularly good shear strength after crosslinking. Moreover, the lower polydispersity makes processing from the melt easier, since the flow viscosity is lower than that of a more broadly distributed polyacrylate, for largely the same service properties. Narrowly distributed poly(meth)acrylates may be prepared advantageously by anionic polymerization or by controlled radical polymerization methods, the latter being especially suitable. Via N-oxyls as well it is possible to prepare corresponding polyacrylates. Besides these methods, atom transfer radical polymerization (ATRP) can be employed advantageously for the synthesis of narrowly distributed polyacrylates, in which case the initiator used preferably comprises monofunctional or difunctional, secondary or tertiary halides, with the halides being abstracted using Cu, Ni, Fe, Pd, Pt, Ru, Os, Rh, Co, Ir, Ag or Au complexes.

The monomers for preparing the poly(meth)acrylates preferably proportionally contain functional groups suitable for entering into linking reactions with epoxide groups. This has the advantageous effect of allowing the polyacrylates to be crosslinked thermally by reaction with epoxides. Linking reactions are, in particular, addition reactions and substitution reactions. Preferably, therefore, there is a linking of the building blocks carrying the functional groups to building blocks carrying epoxide groups, more particularly in the sense of a crosslinking of the polymer building blocks carrying the functional groups, via crosslinker molecules carrying epoxide groups, as linking bridges. The substances containing epoxide groups are preferably polyfunctional epoxides, these being those having at least two epoxide groups; accordingly, there is preferably overall an indirect linking of the building blocks carrying the functional groups.

The poly(meth)acrylates of the PSA of the invention are crosslinked preferably by linking reactions—more particularly in the sense of addition or substitution reactions—of functional groups they contain with thermal crosslinkers. It is possible to use all thermal crosslinkers that both ensure a sufficiently long working time, so that there is no gelling during the processing operation, particularly the extrusion operation, and also lead to rapid postcrosslinking of the polymer to the desired degree of crosslinking at temperatures lower than the processing temperature, more particularly at room temperature. Possibilities include, for example, a combination of polymers containing carboxyl, amine and/or hydroxyl groups with isocyanates, especially aliphatic or amine-deactivated trimerized isocyanates, as crosslinkers.

Suitable isocyanates are, in particular, trimerized derivatives of MDI [4,4-methylenedi(phenyl isocyanate)], HDI [hexamethylene diisocyanate, hexylene 1,6-diisocyanate] and/or IPDI [isophorone diisocyanate, 5-isocyanato-1-isocyanatomethyl-1,3,3-trimethylcyclohexane], examples being the products Desmodur® N3600 and XP2410 (each BAYER AG: aliphatic polyisocyanates, low-viscosity HDI trimers). Likewise suitable is the surface-deactivated dispersion of micronized trimerized IPDI BUEJ 339®, now HF9® (BAYER AG).

Also suitable in principle for the crosslinking, however, are other isocyanates such as Desmodur VL 50 (MDI-based polyisocyanates, Bayer AG), Basonat F200WD (aliphatic polyisocyanate, BASF AG), Basonat HW100 (water-emulsifiable, polyfunctional, HDI-based isocyanate, BASF AG), Basonat HA 300 (allophanate-modified polyisocyanate on isocyanurate, HDI-based, BASF) or Bayhydur VPLS2150/1 (hydrophillically modified IPDI, Bayer AG).

Preferred for use are thermal crosslinkers at 0.1 to 5 wt %, more particularly at 0.2 to 1 wt %, based on the total amount of the polymer to be crosslinked.

The poly(meth)acrylates of the PSA of the invention are preferably crosslinked using one or more epoxides, or one or more substances containing epoxide groups. The substances containing epoxide groups are, more particularly, polyfunctional epoxides, these being those having at least two epoxide groups; correspondingly, there is overall indirect linking of the building blocks in the poly(meth)acrylates that carry the functional groups. The substances containing epoxide groups may be both aromatic and aliphatic compounds.

Outstandingly suitable polyfunctional epoxides are oligomers of epichlorohydrin, epoxy ethers of polyhydric alcohols (especially ethylene, propylene and butylene glycols, polyglycols, thiodiglycols, glycerol, pentaerythritol, sorbitol, polyvinyl alcohol, polyallyl alcohol and the like), epoxy ethers of polyhydric phenols [especially resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dichlorophenyl)propane, bis(4-hydroxyphenyl)phenylmethane, bis(4-hydroxyphenyl)phenylmethane, bis(4-hydroxyphenyl)diphenylmethane, bis(4-hydroxyphenyl)-4'-methylphenylmethane, 1,1-bis(4-hydroxyphenyl)-2,2,2-trichloroethane, bis(4-hydroxyphenyl)(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulfone] and also the hydroxyethyl ethers thereof, phenol-formaldehyde condensation products, such as phenol alcohols, phenolaldehyde resins and the like, S- and N-containing epoxides (for example, N,N-diglycidylaniline, N,N'-dimethyldiglycidyl-4,4-diaminodiphenylmethane), and also epoxides prepared by customary methods from polyunsaturated carboxylic acids or monounsaturated carboxylic esters of unsaturated alcohols, glycidyl esters, polyglycidyl esters, which may be obtained by polymerizing or copolymerizing glycidyl esters of unsaturated acids, or are obtainable from other acidic compounds (cyanuric acid, diglycidyl sulfide, cyclic trimethylene trisulfone and/or derivatives thereof, and others).

Highly suitable ethers are, for example, 1,4-butanediol diglycidyl ether, polyglycerol-3-glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, pentaerythritol tetraglycidyl ether, bisphenol A diglycidyl ether and bisphenol F diglycidyl ether.

Particularly preferred for the poly(meth)acrylates as polymers to be crosslinked is the use of a crosslinker-accelerator system described ("crosslinking system") in EP 1 978 069 A1, for example, in order to obtain better control over the working time, the crosslinking kinetics and also the degree of crosslinking. The crosslinker-accelerator system comprises at least one substance containing epoxide groups, as crosslinker, and as accelerator at least one substance which has an accelerating effect for crosslinking reactions by means of compounds containing epoxide groups, at a temperature below the melting temperature of the polymer to be crosslinked.

Accelerators used very preferably in the invention are amines (to be interpreted formally as substitution products of ammonia; in the formulae below, these substituents are represented by "R" and comprise, in particular, alkyl and/or aryl radicals and/or other organic radicals), especially preferably those amines which enter into no reactions or only minor reactions with the building blocks of the polymers that are to be crosslinked.

In principle, accelerators that can be selected are primary ($NRH_2$), secondary ($NR_2H$) or else tertiary ($NR_3$) amines, and of course also those having two or more primary and/or secondary and/or tertiary amine groups. Accelerators used may advantageously also be polyfunctional amines such as diamines, triamines and/or tetramines. Further preferred accelerators used are amino alcohols. Particular preference is given to using secondary and/or tertiary amino alcohols; in the case of two or more amine functionalities per molecule, preferably at least one and preferably all of the amine functionalities are secondary and/or tertiary.

Other suitable accelerators are pyridine, imidazoles (such as, for example, 2-methylimidazole) and 1,8-diazabicyclo [5.4.0]undec-7-ene. Cycloaliphatic polyamines as well can be used as accelerators. Also suitable are phosphate-based accelerators such as phosphines and/or phosphonium compounds, such as, for example, triphenylphosphine or tetraphenylphosphonium tetraphenylborate.

Acrylate PSAs are typically radically polymerized copolymers of alkyl acrylates or alkyl methacrylates of C1 to C20 alcohols such as, for example, methyl acrylate, ethyl (meth)acrylate, n-butyl (meth)acrylate, t-butyl (meth)acrylate, cyclohexyl (meth)acrylate, 2-ethylhexyl (meth)acrylate, n-octyl (meth)acrylate, isooctyl (meth) acrylate, n-decyl (meth)acrylate, n-dodecyl (meth)acrylate, tetradecyl (meth) acrylate, lauryl (meth)acrylate, oleyl (meth)acrylate, palmityl (meth)acrylate and stearyl (meth)acrylate alongside further (meth)acrylic esters such as isobornyl (meth)acrylate, benzyl (meth)acrylate, phenyl (meth)acrylate and 2-bromoethyl (meth)acrylate, alkoxyalkyl (meth)acrylates such as ethoxyethyl (meth)acrylate. Further included therein are esters of ethylenically unsaturated dicarboxylic and tricarboxylic acids and anhydrides such as ethyl maleate, dimethyl fumarate and ethyl methyl itaconate. Likewise included therein are vinylaromatic monomers such as, for example, styrene, vinyltoluene, methylstyrene, n-butylstyrene, decylstyrene.

Other possible monomers are vinyl esters of carboxylic acids containing up to 20 carbon atoms, such as vinyl acetate or vinyl laurate, vinyl ethers of alcohols containing up to 10 carbon atoms, such as vinyl methyl ether or vinyl isobutyl ether, vinyl halides such as vinyl chloride or vinylidene dichloride, nitriles such as acrylonitrile or methacrylonitrile, acid amides such as acrylamide or methacrylamide, and unsaturated hydrocarbons having 2 to 8 carbon atoms such as ethylene, propene, butadiene, isoprene, 1-hexene or 1-octene.

Suitable for influencing the physical and optical properties of the PSA are polyfunctional ethylenically unsaturated monomers as crosslinker monomers. Examples thereof are divinylbenzene, alkyl diacrylates such as ethylene glycol 1,2-diacrylate, 1,4-butanediol diacrylate, 1,6-hexanediol diacrylate, 1,8-octanediol diacrylate or 1,12-dodecanediol diacrylate, triacrylates such as trimethylolpropane triacrylate, and tetraacrylates such as pentaerythritol tetraacrylate. The group of the polyfunctional monomers also includes UV-crosslinkable monomers, such as, for example, (meth)acrylate-functionalized derivatives of benzophenone or of benzoin.

Another group of monomers are those which generate a latent crosslinking potential in the polymer and which after drying of the adhesive lead spontaneously (frequently catalyzed) to construction of a network. One such monomer is, for example, glycidyl methacrylate, the oxirane ring of which leads, with hydroxyl functions or, in particular, carboxylate functions, with ring opening, to a covalent bond. This reaction is accelerated in the presence of zinc ions or, in particular, in the presence of carboxyl functions, amines.

In order to obtain pressure sensitive adhesive properties, the processing temperature of the adhesive must be above its glass transition temperature, in order to have viscoelastic properties.

Acrylate-based activatable adhesives of the invention may additionally be employed. In that case, then, the activatable adhesives consist, in one particularly preferred interpretation of a base polymer a) consisting of a1) 40 to 95 wt % of acrylic esters and/or methacrylic esters having the following formula $CH_2=C(R_1)(COOR_2)$, where $R_1$ is H or $CH_3$ and $R_2$ is H and/or alkyl chains having 1 to 30 carbons.

a2) 5 to 30 wt % of copolymerizable vinyl monomer having at least one carboxylic and/or sulfonic and/or phosphonic acid group a3) 1 to 10 wt % of a copolymerizable vinyl monomer having at least one epoxy group or an acid anhydride function a4) 0 to 20 wt % of a copolymerizable vinyl monomer which with the functional group is able to contribute to boosting the cohesion, to increasing the reactivity of crosslinking, or to direct crosslinking, and b) 5 to 50 wt % of an epoxy resin or of a mixture of two or more epoxy resins.

The polymer a) may comprise an activatable PSA which becomes pressure sensitively adhesive on exposure to temperature and optionally pressure and which after bonding and cooling solidifies to develop a high peel adhesion. Depending on the service temperature, these activatable PSAs have different static glass transition temperatures $T_{g,a}$ or melting points $T_{m,a}$.

One very preferred version uses acrylic monomers, for the monomers a1), that comprise acrylic and methacrylic esters having alkyl groups consisting of 4 to 14 carbons, preferably 4 to 9 carbons. Specific examples, without wishing to be limited by this recitation, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and the branched isomers thereof such as 2-ethylhexyl acrylate, for example. Further classes of compound for use, which may likewise be added in small amounts under a1), are methyl methacrylates, cyclohexyl methacrylates, isobornyl acrylate and isobornyl methacrylates.

Used preferably as monomers a2) are itaconic acid, acrylic acid, methacrylic acid, vinyl acetic acid, fumaric acid, crotonic acid, aconitic acid, dimethylacrylic acid, β-acryloyloxypropionic acid, trichloroacrylic acid, vinylphosphonic acid and vinylsulfonic acid.

Used preferably as monomers a3) are glycidyl methacrylate, maleic anhydride and itaconic anhydride.

One very preferred version uses, for the monomers a4), vinyl esters, vinyl ethers, vinyl halides, vinylidene halides, vinyl compounds with aromatic ring systems and heterocycles in a position. Here as well, nonexclusive mention may be made of certain examples: vinyl acetate, vinylformamide, vinylpyridine, ethyl vinyl ether, vinyl chloride, vinylidene chloride and acrylonitrile. One very preferred version for the monomers a4) uses monomers having the following functional groups: hydroxyl, acid amide, isocyanato or amino groups.

Other particularly preferred examples for component a4) are hydroxyethyl acrylate, hydroxypropyl acrylate, hydroxyethyl methacrylate, hydroxypropyl methacrylate, allyl alcohol, acrylamide, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, 6-hydroxyhexyl methacrylate, N-tert-butylacrylamide, N-methylolmethacrylamide, N-(butoxymethyl) methacrylamide, N-methylolacrylamide, N-(ethoxymethyl) acrylamide, N-isopropylacrylamide, tetrahydrofurfuryl acrylate, this enumeration not being exhaustive.

In a further preferred version, aromatic vinyl compounds are used for component a4), where preferably the aromatic rings may consist of $C_4$ to $C_{18}$ and may also contain heteroatoms. Particularly preferred examples are styrene, 4-vinylpyridine, N-vinylphthalimide, methylstyrene, 3,4-dimethoxystyrene, 4-vinylbenzoic acid, with this enumeration not being exhaustive.

For the polymerization the monomers are in turn selected such that the resulting polymers can be employed as industrially utilizable adhesives or PSAs, more particularly such that the resulting polymers possess adhesive or pressure sensitive adhesive properties in accordance with the "Handbook of Pressure Sensitive Adhesive Technology" by Donatas Satas (1989). Here as well the desired glass transition temperature may be controlled through the application of the Fox equation (E1) for the compilation of the monomer mixture on which the polymerization is based. For PSAs the static glass transition temperature of the resulting polymer is advantageously below 15° C.

In order to obtain a glass transition temperature $T_{g,a}$ of the polymers of $T_{g,a} \geq 30°$ C. for heat-activatable adhesive, the monomers, in line with the statement above, are very preferably selected such, and the quantitative composition of the monomer mixture advantageously selected such, that the desired $T_{g,a}$ for the polymer is obtained in accordance with the Fox equation (E1) (cf. T. G. Fox, Bull. Am. Phys. Soc. 1 (1956) 123).

$$\frac{1}{T_g} = \sum_n \frac{w_n}{T_{g,n}} \quad (E1)$$

In this equation, n represents the serial number of the monomers used, $w_n$ the mass fraction of the respective monomer n (wt %), and $T_{g,n}$ the respective glass transition temperature of the homopolymer of the respective monomers n in K.

The adhesives are advantageously produced using conventional radical polymerizations or controlled radical polymerizations. For the polymerizations proceeding by a radical mechanism, preference is given to using initiator systems which additionally contain further radical initiators for the polymerization, especially radical-forming azo or peroxo initiators which decompose thermally. Suitable in principle, however, are all customary initiators which are familiar to the skilled person for acrylates. The production of C-centered radicals is described in Houben Weyl, Methoden der Organischen Chemie, Vol. E 19a, pages 60 to 147. These methods are preferably applied analogously.

Examples of radical sources are peroxides, hydroperoxides and azo compounds; a number of nonexclusive examples that may be given of typical radical initiators here are potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, benzopinacol. One very preferred version uses 1,1'-azobis (cyclohexanecarbonitrile) (Vazo 88™ from DuPont) as radical initiator.

The average molecular weights $M_n$ of the PSAs formed in the radical polymerization are very preferably selected such that they lie within a range from 20 000 to 2 000 000 g/mol; specifically for further use as pressure sensitive hot melt adhesives, PSAs having average molecular weights $M_n$ of 100 000 to 500 000 g/mol are produced.

The polymerization may be carried out in bulk, in the presence of one or more organic solvents, in the presence of water, or in mixtures of organic solvents and water. The aim here is to minimize the amount of solvent used.

The polymerization time amounts—according to conversion and temperature—to between 4 and 72 hours. The higher the reaction temperature that can be selected, in other words the higher the thermal stability of the reaction mixture, the lower the reaction time that can be selected.

In order to optimize the properties, the self-adhesive composition employed may have been blended with one or more additives such as plasticizers, fillers, pigments, UV absorbers, light stabilizers, aging inhibitors, crosslinking agents, crosslinking promoters or elastomers. Other tackifier resins may be employed as well, with preference being given to the use of tackifier resins exclusively in accordance with the invention.

Examples of suitable fillers and pigments are carbon black, titanium dioxide, calcium carbonate, zinc carbonate, zinc oxide, silicates or silica.

Suitable plasticizers are, for example, aliphatic, cycloaliphatic and aromatic mineral oils, diesters or polyesters of phthalic acid, trimellitic acid or adipic acid, liquid rubbers (for example, nitrile rubbers or polyisoprene rubbers), liquid polymers of butene and/or isobutene, acrylic esters, polyvinyl ethers, liquid resins and plasticizing resins based on the raw materials for tackifier resins, wool wax and other waxes, or liquid silicones.

Crosslinking agents are, for example, phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acids.

The present invention lastly relates also to a pressure sensitive adhesive tape comprising at least one layer of the pressure sensitive adhesive of the invention.

In the sense of this invention, the general expression "adhesive tape" (pressure sensitive adhesive tape), synonymously also "adhesive strip" (pressure sensitive adhesive strip), embraces all sheetlike structures, such as two-dimensionally extended films or film sections, tapes with extended length and limited width, tape sections and the like, and also, lastly, diecuts or labels.

The adhesive tape thus has a longitudinal extent (x direction) and a lateral extent (y direction). The adhesive tape also has a thickness (z direction) running at right angles to the two extents, with the lateral extent and longitudinal extent being greater by a multiple than the thickness. The thickness is very substantially equal, preferably exactly the same, over the entire two-dimensional extent of the pressure sensitive adhesive tape as defined by the length and width.

In one preferred embodiment of the present invention, the adhesive tape used in the invention consists of a single layer of pressure sensitive adhesive. A single-layer, double-sidedly adhering adhesive tape of this kind, i.e., a double-sided adhesive tape, is also referred to as a "transfer tape". In one alternative embodiment the adhesive tape used in the invention comprises a carrier layer and at least one, preferably two, layers of pressure sensitive adhesive, with the PSA layers being disposed on the opposing surfaces of the carrier layer and forming an outer upper surface and an outer lower surface of the pressure sensitive adhesive strip. This product is therefore a single-sided adhesive tape or, again, a double-sided adhesive tape. It is also possible for further layers and/or interliners to be employed. Accordingly, for establishing the properties, it is also possible to use different layers of adhesive or a combination of layers of adhesive and carrier layers. The properties which can be influenced in this way include thickness, stiffness, flexibility, temperature resistance, elasticity and flame retardancy of the adhesive tape. Suitable adhesive tapes in accordance with the invention therefore encompass single-layer and multilayer adhesive tapes.

Adhesive tapes of the invention that have been coated with adhesives on one or both sides are usually wound up at the end of the production process to give a roll in the form of an Archimedean spiral. In order to prevent the PSAs coming into contact with one another in the case of double-sided adhesive tapes, or in order to ensure easier unwinding in the case of single-sided adhesive tapes, the adhesive before the winding of the adhesive tape is covered with a covering material (also referred to as release material). Covering materials of this kind are familiar to the skilled person as liners or release liners. In addition to the covering of single-sided or double-sided adhesive tapes, liners are also employed for the covering of labels. A liner (release paper, release film) is not part of a pressure sensitive adhesive strip, but merely an aid to its production, storage and/or further processing by diecutting. Furthermore, a liner, by contrast with a (permanent) adhesive tape carrier, is not firmly joined to a layer of adhesive, and hence is also referred to as a temporary carrier. The liners additionally ensure that the adhesive is not soiled prior to use. In addition, liners can be adjusted via the nature and composition of the release materials in such a way that the adhesive tape can be unwound with the desired force (easy or hard). In the case of adhesive tapes with a coating of adhesive on both sides, the liners additionally ensure that the correct side of the adhesive is exposed first during unwind.

Adhesives can be produced in solvent-containing or solvent-free processes, by means of liquid coating, extrusion or other suitable methods. Coating takes place in one or more operations, including coextrusion or multi-ply die coating, or lamination.

In this case either the liner material itself may already be antiadhesive, or else it is given an antiadhesive coating—is siliconized, for example—at least on one side, preferably on both sides. This embraces in particular all layers in sheet form that can be suitably separated from the adhesive tape, including, for example, those with their own pressure sensitive adhesiveness.

Liners used are typically paper or film carriers which on one side or, more particularly, on both sides are furnished with an abhesive coating composition (also referred to as a dehesive or antiadhesive composition) in order to reduce the tendency of adhering products to adhere to these surfaces (release-effective function). Liners for self-adhesive tapes are frequently based on biaxially or monoaxially oriented polypropylene, on polyethylene or other polyolefins, on paper or on polyester. Abhesive coating compositions, also referred to as release coating, may comprise a multiplicity of different substances: waxes, fluorinated or partly fluorinated compounds, carbamate varnishes and, in particular, silicones and also various copolymers with silicone fractions. In recent years, silicones have become widely established as release materials in the field of adhesive tape application, by virtue of their good processing properties, low costs and broad profile of properties. As liners it is additionally possible to use structured liners or liners with fillers or other particulate substances or particles in or on the surface, or liners consisting of or coated with other suitable releasing layers or coatings.

In accordance with the invention there are also carriers which function as a temporary carrier (liner) or else as a permanent carrier (i.e., carrier in the sense of the patent application) depending on which side the adhesive layer is applied. Where a carrier has only a single antiadhesive surface, while the opposite surface is not antiadhesive (for example, a single-sidedly siliconized PET carrier), it acts as a liner when the adhesive layer is applied to the antiadhesive surface, whereas it acts as a carrier when the adhesive layer is applied to the non-antiadhesive surface.

In terms of the adhesive tape, there are a variety of conceivable product constructions. There is always at least one layer of a self-adhesive composition present. This layer may have a thickness of 15 to 5000 µm, preferably 50 to 3000 µm, more preferably 100 µm to 2000 µm, more preferably still 150 µm to 2000 µm, more preferably still 400 to 1500 µm, more particularly 1000 to 1200 µm, such as, for example, 500 to 800 µm. The pressure sensitive adhesive strip may comprise further layers such as, for example, further adhesive layers. The adhesive tape may further comprise nonadhesive layers, including, in particular, carrier layers which are low-stretch ($\varepsilon_{max}$<100%) or stretchable ($\varepsilon_{max}$ at least 100%). Any carrier present is preferably a carrier film, composed of polypropylene, polyethylene or polyester, for example. For strippable pressure sensitive adhesive tapes there is preference given to using elastic carriers, such as a viscoelastic acrylate foam, for example, which is foamed using microballoons, for example. Alternatively the acrylate foam may also comprise hollow glass beads.

EXPERIMENTAL SECTION

Test Methods

Unless stated otherwise, all measurements were carried out at 23° C. and 50% relative humidity.

The mechanical and technical adhesive data were ascertained as follows:

Tackifier Resin Softening Point

The softening point was measured using a Herzog HRB 754 R&B (Ring & Ball) softening point instrument. The softening point was measured according to the standard ASTM E28/EN1427 measuring program.

Static Glass Transition Temperature $T_g$, Melting Temperature, Softening Temperature Glass transition points—referred to synonymously as glass transition temperatures—particularly of polymers and/or polymer blocks are reported as results of measurements by means of dynamic scanning calorimetry (DSC) according to DIN 53 765, especially sections 7.1 and 8.1, but with uniform heating and cooling rates of 10 K/min in all heating and cooling steps (compare DIN 53 765; section 7.1; note 1). The initial sample mass is 20 mg. The melting temperature/softening temperature of polymers/polymer blocks is also ascertained in this way.

Gel Permeation Chromatography (GPC)

The molar mass distribution and hence also the position of the low molecular mass peak in the spectrum were determined by means of GPC as follows: the eluent used is THF with 0.1 vol % of trifluoroacetic acid. The measurement takes place at 25° C. The precolumn used is PSS-SDV, 5µ, $10^3$ Å, ID 8.0 mm×50 mm. Separation takes place using the columns PSS-SDV, 5µ, $10^3$ Å and also $10^5$ Å and $10^6$ Å each with ID 8.0 mm×300 mm. The sample concentration is 4 g/l, the flow rate 1.0 ml per minute. Measurement takes place against PMMA standards. (µ=µm; 1 Å=$10^{-10}$ m).

Examples

As they age, low-softening-point terpene-phenolic resins experience an increase in the softening point. This increase in softening point is dependent on the type of the terpene unit. Accordingly, different terpene-phenolic resins were prepared, and their softening points were determined after preparation and also after storage.

Production of Samples

TABLE 1

Formulations of the terpene-phenolic resins

| Samples | Basis | R&B [° C.] | Mn [g/mol] | Mw [g/mol] | Mz [g/mol] | Pd |
|---|---|---|---|---|---|---|
| TP Resin 1 | δ3-carene | 97 | 513 | 753 | 1060 | 1.47 |
| TP Resin 2 | α-pinene | 98 | 559 | 729 | 943 | 1.3 |
| TP Resin 3 | δ3-carene | 106 | 561 | 825 | 1180 | 1.47 |
| TP Resin 4 | α-pinene | 106 | 601 | 813 | 1090 | 1.35 |
| TP Resin 5 | δ3-carene | 98 | 537 | 868 | 1309 | 1.6 |
| TP Resin 6 | α-pinene | 100 | 550 | 781 | 1130 | 1.42 |
| TP Resin 7 | δ3-carene | 109 | 548 | 869 | 1304 | 1.58 |
| TP Resin 8 | α-pinene | 108 | 590 | 800 | 1070 | 1.36 |

Tables 2 and 3 assemble the results of a storage test on two different terpene-phenolic resins. Characterization took place via measurement of softening points.

TABLE 2

Softening point of δ3-carene and α-pinene based terpene-phenolic resins with R&B 95 ± 3° C.

| Resin | Basis | Fresh values | 1 month at RT storage | 2 months at RT storage |
|---|---|---|---|---|
| TP 1 | δ3-carene | 97 | 97 | 98 |
| TP 2 | α-pinene | 98 | 102 | 105 |

TABLE 3

Softening point of δ3-carene and α-pinene based terpene-phenolic resins with R&B 105 ± 3° C.

| Resin | Basis | Fresh values | 1 month at RT storage | 2 months at RT storage |
|---|---|---|---|---|
| TP 1 | δ3-carene | 106 | 106 | 107 |
| TP 2 | α-pinene | 106 | 108 | 110 |

From tables 2 and 3 it is apparent that δ3-carene based terpene-phenolic resins exhibit better stability in the aging process than α-pinene based terpene-phenolic resins, even with softening points below 110° C. δ3-carene based terpene-phenolic resins have stable physical properties under prolonged room-temperature storage.

Even at higher storage temperatures, however, terpene-phenolic resins of the invention prove to be more storage-stable.

Example 1

A δ3-carene based terpene-phenolic resin was subjected to thermal loading. This was done by storing the resin in a drying cabinet at 40° C. for 3 weeks. The softening point was checked at one-week intervals. The results can be seen in the table below.

TABLE 4

Softening point of δ3-carene based terpene-phenolic resins

| Resins | Basis | Fresh value | 1 week at 40° C. storage | 2 weeks at 40° C. storage | 3 weeks at 40° C. storage |
|---|---|---|---|---|---|
| TP 5 | δ3-carene | 98 | 97 | 98 | 99 |

The associated GPC of the δ3-carene based terpene-phenol with R&B 95° C. is shown in FIG. 1.

Example 2

A α-pinene based terpene-phenol was subjected to thermal loading. This was done by storing the resin in a drying cabinet at 40° C. for 3 weeks. The softening point was checked at one-week intervals. The results can be seen in the table below.

TABLE 5

Softening point of α-pinene based terpene-phenolic resins

| Resins | Basis | Fresh value | 1 week at 40° C. storage | 2 weeks at 40° C. storage | 3 weeks at 40° C. storage |
|---|---|---|---|---|---|
| TP 6 | α-pinene | 100 | 102 | 102 | 104 |

Figure 2:
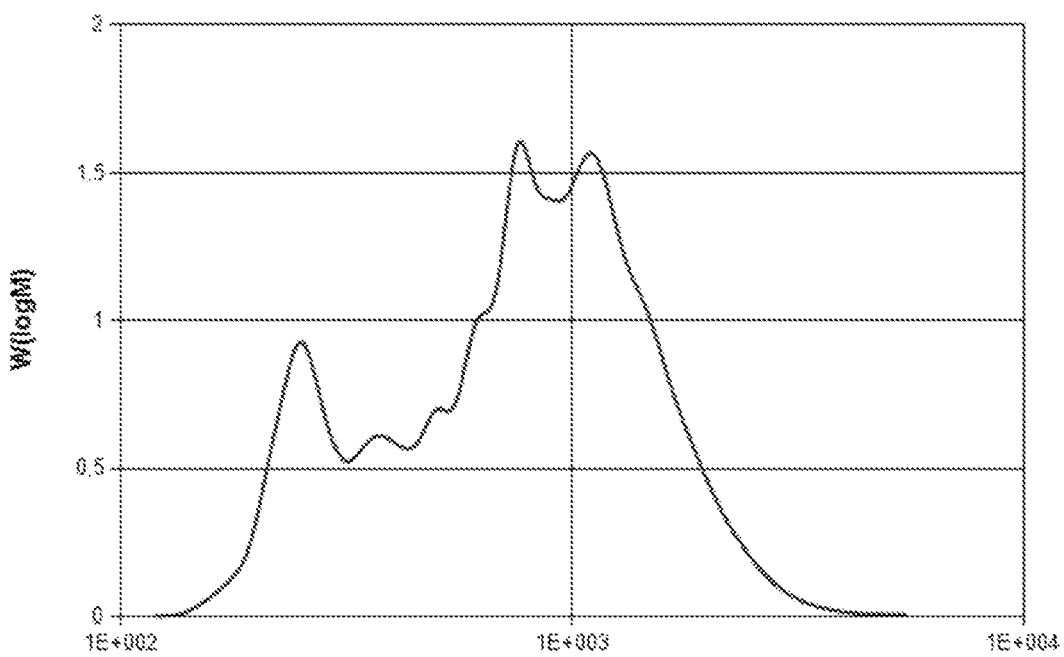
FIG. 2 is a graph depicting the associated GPC of the α-pinene based terpene-phenol with R&B 95° C.

The associated GPC of the α-pinene based terpene-phenol with R&B 95° C. is shown in FIG. 2.

Figure 3:
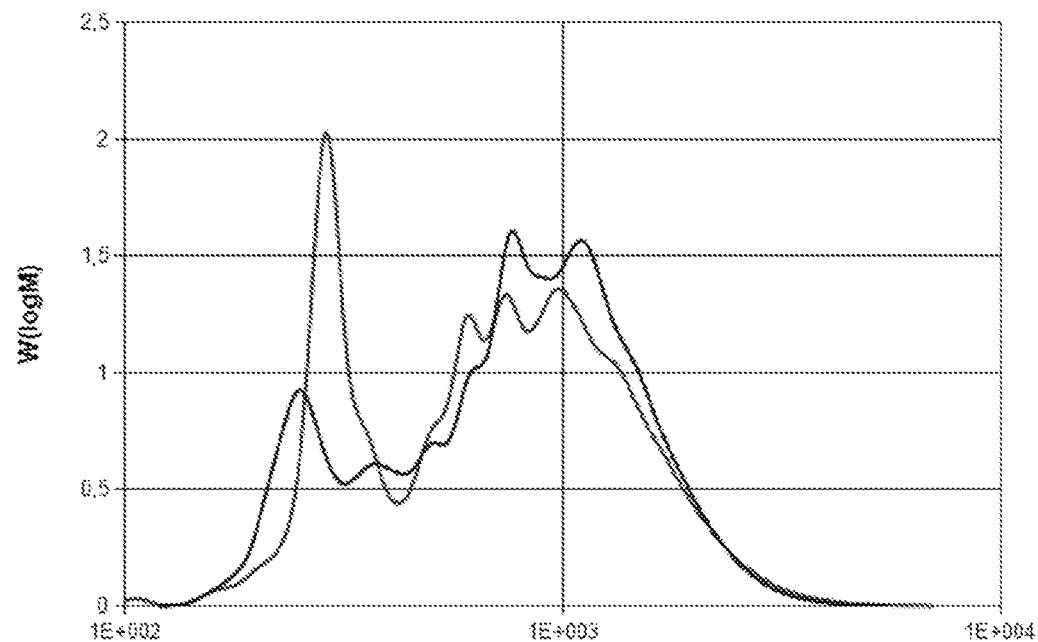
FIG. 3 is a graph depicting both the associated GPC of the δ3-carene based terpene-phenol with R&B 95° C. and the associated GPC of the α-pinene based terpene-phenol with R&B 95° C.

FIG. 3 shows the GPC curves for the resin of example 1 in comparison to the resin of example 2, laid over one another. The shift in the maximum of the low molecular mass peak is clearly apparent.

Example 3

A δ3-carene based terpene-phenol with higher softening point was subjected to thermal loading. This was done by storing the resin in a drying cabinet at 40° C. for 3 weeks. The softening point was checked at one-week intervals. The results can be seen in the table below.

Table 6: Softening point of δ3-carene based terpene-phenolic resins

| Resins | Basis | Fresh value | 1 week at 40° C. storage | 2 weeks at 40° C. storage | 3 weeks at 40° C. storage |
|---|---|---|---|---|---|
| TP 7 | δ3-carene | 109 | 109 | 108 | 109 |

Figure 4:
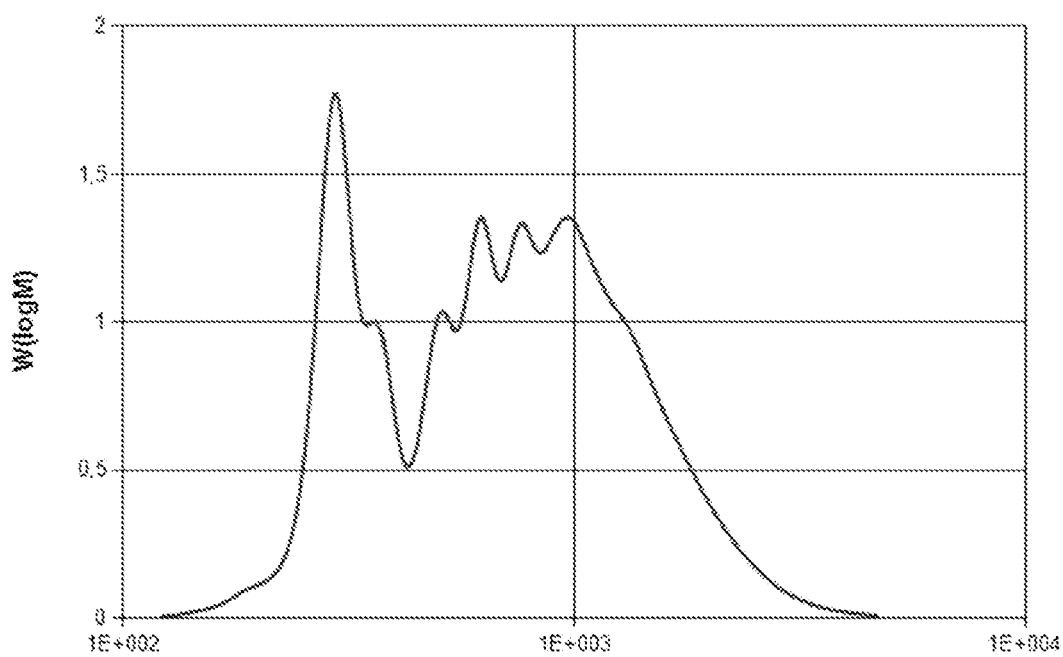
FIG. 4 is another graph depicting the associated GPC of the δ3-carene based terpene-phenol with R&B 105° C.

The associated GPC of the δ3-carene based terpene-phenol with R&B 105° C. is shown in FIG. 4.

Example 4

A α-pinene based terpene-phenol with higher softening point was subjected to thermal loading. This was done by storing the resin in a drying cabinet at 40° C. for 3 weeks. The softening point was checked at one-week intervals. The results can be seen in the table below.

Table 7: Softening point of α-pinene based terpene-phenolic resins

| Resins | Basis | Fresh value | 1 week at 40° C. storage | 2 weeks at 40° C. storage | 3 weeks at 40° C. storage |
|---|---|---|---|---|---|
| TP 8 | α-pinene | 108 | 110 | 110 | 111 |

Figure 5:
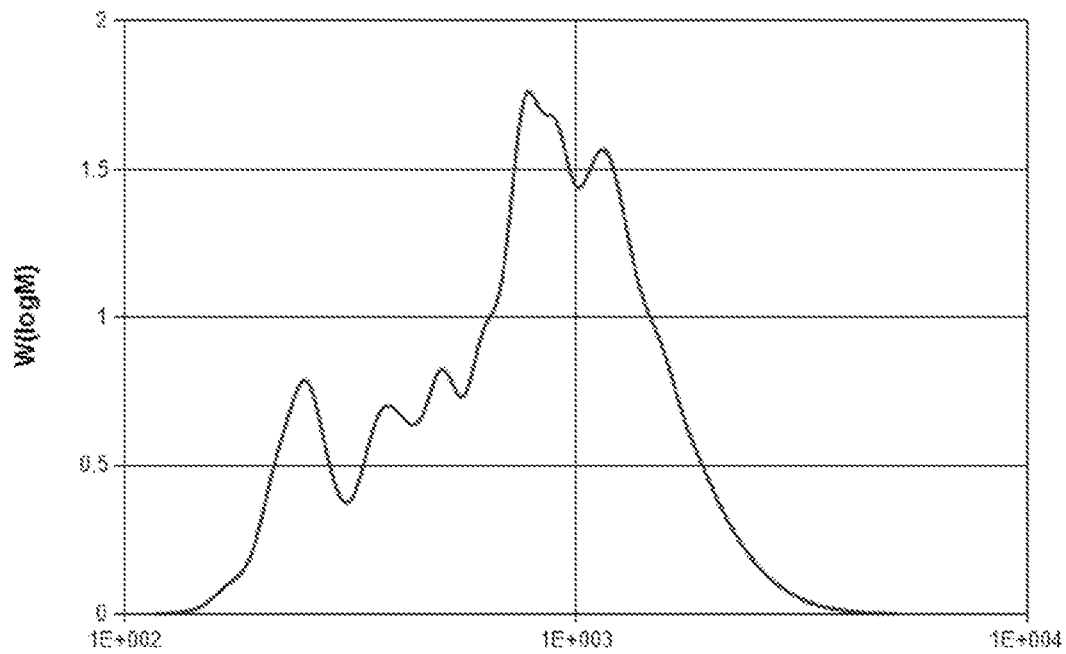
FIG. 5 is a graph depicting the associated GPC of the α-pinene based terpene-phenol with R&B 105° C.

The associated GPC of the α-pinene based terpene-phenol with R&B 105° C. is shown in FIG. 5.

Figure 6:
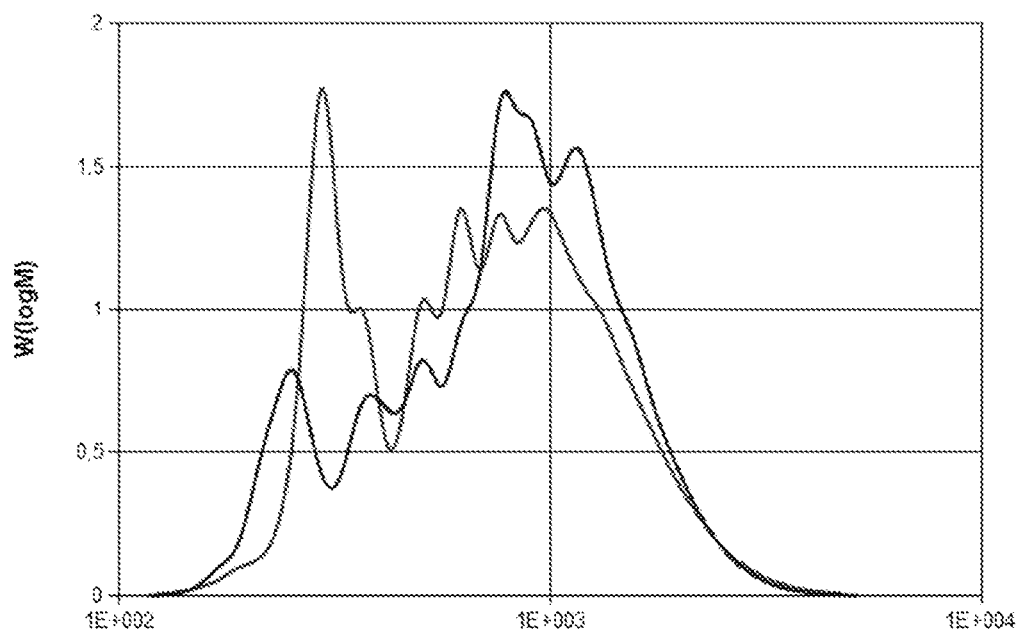
FIG. 6 is another graph depicting both the associated GPC of the δ3-carene based terpene-phenol with R&B 105° C. and the associated GPC of the α-pinene based terpene-phenol with R&B 105° C.

FIG. 6 shows the GPC curves for the resin of example 3 (α-pinene based) in comparison to the resin of example 4 (δ3-carene based), laid over one another. The shift in the maximum of the low molecular mass peak is clearly apparent.

As can be seen from FIGS. 3 and 6, the α-pinene and δ3-carene based resins differ in position and intensity of the low molecular mass peak. This difference can be traced back to a difference in the characteristic physical data of the resins. In examples 3 and 4, the softening points were ascertained over a defined storage period. It emerged that the δ3-carene-based terpene-phenolic resin exhibits better aging behavior.

The invention claimed is:

1. A pressure-sensitive adhesive comprising
at least one polar scaffold polymer,
at least one terpene-phenolic resin as tackifier resin,
wherein the at least one terpene-phenolic resin under analysis by gel permeation chromatography shows a multimodal molar mass distribution, with the low molecular mass peak having its maximum in a region above 260 g/mol.

2. The pressure-sensitive adhesive as claimed in claim 1, wherein the at least one terpene-phenolic resin is δ3-carene based.

3. The pressure-sensitive adhesive as claimed in claim 1, wherein the terpene-phenolic resin further comprises α-pinene.

4. The pressure-sensitive adhesive as claimed in claim 1, wherein the polar scaffold polymers are poly(meth)acrylates.

5. The pressure-sensitive adhesive as claimed in claim 1, wherein the softening point of the terpene-phenolic resin is in the range from 60° C. to 200° C.

6. A pressure-sensitive adhesive tape comprising at least one layer of the pressure sensitive adhesive as claimed in claim 1.

7. A method of adhesive bonding comprising bonding an adhesive tape as claimed in claim 6 to a substrate.

\* \* \* \* \*